United States Patent [19]
Petitjean et al.

[11] 3,728,432
[45] Apr. 17, 1973

[54] PURIFICATION OF SODIUM ALUMINATE SOLUTIONS

[75] Inventors: Marc Petitjean, Marseille Ile; Georges Rollet, Marseille, both of France

[73] Assignee: Ugine Kuhlmann, Paris, France

[22] Filed: Aug. 24, 1970

[21] Appl. No.: 66,593

Related U.S. Application Data

[63] Continuation of Ser. No. 660,914, Aug. 16, 1967, abandoned.

[30] Foreign Application Priority Data

Aug. 18, 1966 France.................................6673427

[52] U.S. Cl. .................423/121, 423/600, 252/412, 134/34
[51] Int. Cl. .............................................C01k 7/02
[58] Field of Search..........................23/52, 141, 143; 134/2, 34, 42; 252/412

[56] References Cited

UNITED STATES PATENTS

| | | | |
|---|---|---|---|
| 3,399,958 | 9/1968 | Brown | 23/52 |
| 3,457,032 | 7/1969 | Breteque | 23/52 |
| 3,002,809 | 10/1961 | Walker | 23/52 |
| 3,397,953 | 8/1968 | Galvin et al. | 23/143 |

*Primary Examiner*—Herbert T. Carter
*Attorney*—Pennie, Edmonds, Morton, Taylor and Adams

[57] ABSTRACT

Solutions of sodium aluminate obtained by the alkaline treatment of bauxite ores are purified by the removal of dissolved iron therefrom through the placing of these solutions in contact with granular bauxite ores. The contacting of solutions of sodium aluminate with granular bauxite ore causes the rapid decomposition of dissolved iron and precipitation of the resultant iron oxide on the bauxite grains.

10 Claims, No Drawings

PURIFICATION OF SODIUM ALUMINATE SOLUTIONS

This application is a continuation of Ser. No. 660,914, filed Aug. 16, 1967 and now abandoned.

BACKGROUND OF THE INVENTION

1. Field of the Invention

This invention relates to a process for the purification of sodium aluminate solutions by the contacting of these solutions with granular bauxite ores.

2. Description of the Prior Art

In the processing of metallic aluminum, bauxite, a term generically applied to ores composed principally of the hydrated oxides of aluminum, is finely ground and charged into digestors with caustic soda. The digestion, which is carried out under pressure for a suitable period of time, results in alumina ($Al_2O_3$) being dissolved as sodium aluminate in the caustic solution. The caustic solution of sodium aluminate is then separated from the insoluble residue, which contains a high percentage of iron oxide, commonly termed "red mud", by means of settling and filtration.

Research into the conditions of the alkaline treatment of bauxites, in particular bauxites containing alumina in the form of its monohydrate, has led to an increase in the pressures used in the process which has improved the alumina extraction yield. Previously, pressures of 12 Kg/cm were used at temperatures on the order of 190°C. In current practice, pressure on the order of 30 to 40 Kg/cm² and temperatures on the order of 220° to 250°C. are being used. This development has served to raise the extraction yields of alumina from 80 percent to about 95 percent.

When the reaction was carried on at low pressure, the iron oxide present in the bauxite ore was left undisturbed; this oxide remained in the form of particles in suspension. To remove the suspension of iron oxides it was sufficient to decant and filter the mixture resulting from the reaction which left a clear filtrate practically free from iron. At the present temperatures and pressures of reaction used to obtain the higher yields of alumina, some of the iron goes into solution. The aluminate solutions obtained after separation from the iron oxides by decantation are practically freed from suspended iron in the form of $Fe_2O_3$, but contain a quantity of dissolved iron that may amount to 40 mg/l. When the aluminate solutions are subjected to decomposition the soluble iron compounds decompose at the same time as the aluminate, according to a function fairly close to that governing the decomposition of the latter. The iron thus precipitated with the alumina contaminates the latter, with the result that there is great difficulty in obtaining aluminum of high purity, assaying over 99.85 percent, the grade which it is now desired to produce.

The complete elimination of the small quantity of iron oxides in suspension in the aluminate liquors after decantation is accomplished, in most cases, by means of filtration through frame filters. The filter cloths used in the filtration process are often coated with an adjuvant such as calcium carbonate, coke, cellulose, or precipitated alumina. Other methods or adjuvants have been used and have served to provide an aluminate liquor free from any impurities in suspension.

Various methods have been proposed to eliminate dissolved iron. In particular mentioned may be made of prolonged agitation of a mixture of liquor and "red muds", absorption of iron ions on a cellulose column, and controlled electrolysis of the liquor. These processes have the disadvantage of being extremely slow and costly. In addition, partial decomposition of the aluminate solution has also been suggested, in the course of which some of the alumina precipitates at the same time as the dissolved iron; the solids thus obtained are separated from the solution. This process, however, results in some of the alumina contained in the solution being lost and is undesirable for that reason.

In general, all of these methods have the disadvantage of involving considerable expense, either because they require costly or large equipment to immobilize large quantities of liquor or suspension, or because they involve special reagents or adjuvants of limited life. They produce impure products which must be further treated to recover the valuable components.

SUMMARY OF THE INVENTION

The present invention is based on the discovery that solutions of sodium aluminate, obtained by the alkaline treatment of bauxite ores, can be efficiently purified by the removal of iron (either in the dissolved form or as iron oxides) by contacting these solutions with granular bauxite ore. Broadly stated the process of this invention comprises contacting solutions of sodium aluminate by passing them over or through beds of granular monohydrate bauxite and recovering the purified sodium aluminate solution.

The contacting of solutions of sodium aluminate with a bauxite ore, preferably a granular monohydrate bauxite, causes rapid decomposition of soluble iron compounds present in the solutions and, hence, the precipitation of iron oxide on the grains of bauxite. In the course of this decomposition there is very little precipitation of alumina by decomposition of sodium aluminate.

Solutions of sodium aluminate may be passed over a bed of granular bauxite ore or, alternatively, passed through a filtering bed of granular bauxite ore which serves to both precipitate oxides of iron from solution and also to remove these oxides from solution through their adhesion on the surface of the bauxite ore. The invention thus provides for the precipitation of dissolved iron in aluminate solutions without elimination of the precipitate and for precipitation of the dissolved iron with the simultaneous elimination of the iron oxides.

The precipitation of dissolved iron and iron in suspension is more complete the higher the ratio of the surface area of the grains to the flow of liquid treated. Further, the precipitation of iron oxides decreases when the oxide has deposited on the surface of the bauxite grains. Said surface must then be regenerated. The precipitation of iron oxides may be carried out by passing the liquid to be purified through a moving bed of bauxite grains held in suspension and agitated by the current. Alternatively, the liquid may be passed through a stationary bed of bauxite, in which case, to eliminate the iron completely, the liquid need merely be filtered.

DESCRIPTION OF THE PREFERRED EMBODIMENTS

The purification of solutions of sodium aluminate containing small quantities of dissolved iron may be carried out by passing the solution to be purified over a bed of granular monohydrate bauxite. Preferably, the size of the bauxite grains is in the range from 5 mm. to 0.5 mm. The ratio of the surface area of the bauxite grains, expressed in square meters, to the flow rate of the solution of sodium aluminate, expressed in cubic meters per hour, is preferably in the range between 150 and 600.

The process of this invention is advantageously carried out by means of simultaneous precipitation and filtration, in which filters of known types such as the general sand filter type may be used. It is advantageous to use filters in which the solution to be purified first traverses a layer of coarse bauxite grains, which distributes the liquid and retains at least some of the iron oxide initially in suspension, and then traverses further layers of bauxite grains of increasing fineness. The total thickness of the filtering bed should be sufficient to insure the decomposition of all of the soluble iron that comes into contact with the fine grains. The period of contact of the dissolved iron with the bauxite ore should be of sufficient duration so that the retention of the iron oxide in suspension is total. The decomposition may be divided between two successive units of the same type, thus achieving the practically total elimination of dissolved iron, without resulting in excessive clogging of the decomposition bed and a corresponding reduction of flow of solutions therethrough.

A common occurrence in any process which involves the precipitation of material from a solution is the clogging of filters. In the present process the filters may become clogged with iron oxide or decomposed alumina in which case the flow rate of sodium aluminate solutions therethrough will be reduced. The filters may be freed of these precipitated materials by causing a crude aluminate solution to flow through the filters at a sufficient rate of flow to place at least the fine portions of the filtering layers in suspension. The precipitated iron oxide thus entrained in the form of a muddy liquid is eliminated by returning the liquid into the bauxite treating circuit, as, for example, into decanters which effect separation of the "red mud" from the crude aluminate solution.

In the event of the occurrence of deposits of alumina in the filtering beds due to the undesirable decomposition of the circulating aluminate solution, with the result that contact between the bauxite grains and the liquor to be purified is restricted, the bauxite may be regenerated by treatment with a low-alumina-content liquor which is heated to between 80° and 110°C. For example, a lean liquor taken from the outlet of the decomposition equipment may be heated and used to attack the precipitated alumina on the surface of the bauxite grains without attacking the grains themselves. This avoids the need to replace the bauxite layers with fresh bauxite ore.

Further to illustrate this invention, specific examples are described hereinbelow.

EXAMPLE I

The filter used consisted of a cylinder 34 cm. in diameter with a cross-section slightly less than 0.1 m². The filtering charge consisted of a 2-m column of monohydrate bauxite with granulometry diminishing from 40 mm. at the bottom to 0.5 mm. at the top. The purified liquid was drawn off by a drain in the middle of the fine layer. This filter was supplied with aluminate liquor, at 95°C., having the following compositions:

| | |
|---|---|
| $Na_2O$, caustic | 158 g./l. |
| $Na_2O$ carbonate | 18 |
| $Al_2O$ | 164 |
| $Fe_2O_3$ in solution | 25 mg./l. |
| $Fe_2O_3$ in suspension | 10–50 mg./l. |
| Molar ratio $\dfrac{\text{caustic } Na_2O}{Al_2O_3}$ | 1.58 |

The solution was placed under a constant head of 900 g./cm² with an initial flow of 700 l./hr. Due to the gradual clogging of the filter, the instantaneous flow dropped to 550 l./hr. after 2 hours, 450 l./hr. after 5 hours, 400 l./hr. after 8 hours and 300 l./hr. after 23 hours.

A series of samples were taken from the filtrate during the cycle. The iron content of the last sample was:
$Fe_2O_3$ in solution — between 2 and 5 mg./l.
$Fe_2O_3$ in suspension — practically none.
The other samples had lower dissolved iron contents.

EXAMPLE II

After a high degree of clogging, the filter was cleaned as described hereinabove by means of a crude sodium aluminate solution. The filter was then employed under the same conditions as in EXAMPLE I under a constant head of 900 g./cm² with the same solution being treated. After 20 hours of filtration, the filter showed:
$Fe_2O_3$ in solution — 4 mg./l.
$Fe_2O_3$ in suspension — practically none.

EXAMPLE III

After a cycle of filtration and extreme clogging under a constant head of 1,200g./cm² until the instantaneous flow became 100 l./hr., the filter l. cleaned as previously stated. mg./l. was supplied with aluminate liquor, the flow being allowed to vary of itself by natural clogging of the layer. The following results were None None 17

| Period of Operation | Instantaneous Flow | Solution | $Fe_2O_3$ in: Suspension |
|---|---|---|---|
| 1 hr. | 1200 l. | 21 mg./l. | None |
| 2 | 700 | 12 | None |
| 5 | 500 | 5 | None |
| 22 | 150 | 5 | None |

EXAMPLE IV

For purposes of comparison, the filtering charge of bauxite was replaced by a limestone charge of similar granulometry. The same flow characteristics were obtained as in EXAMPLE I, but there was no diminution in dissolved iron content.

Other tests performed with anthracite gave intermediate results; for flow characteristics similar to those of EXAMPLE I, the dissolved iron content was diminished by 25 to 30 percent, or far less than the diminution of more than 70 percent obtainable with bauxite.

We claim:

1. A process for producing purified solutions of sodium aluminate free of any objectionable iron content which comprises (1) heating an aqueous alkaline bauxite ore mixture at sufficiently elevated temperatures and pressures to produce high yields of sodium aluminate and to also produce an undersirable quantity of dissolved iron in said solution and (2) contacting said sodium aluminate solution containing the dissolved iron with granular bauxite ore in a sufficient amount and for a sufficient length of time to remove all of the undesirable dissolved iron contained in said solution.

2. A process according to claim 1 in which solids are removed from the sodium aluminate product producing step (1) before contacting the solution with the bauxite in step (2).

3. A process according to claim 1 in which said solutions of sodium aluminate are passed over a bed of granular monohydrate bauxite wherein the ratio of the surface area of said bauxite grains, expressed in square meters, to the rate of flow of said solutions of sodium aluminate, expressed in cubic meters per hour, is in the range from 150 to 600.

4. A process according to claim 1 in which the product resulting from the contacting of said solutions of sodium aluminate with said granular bauxite ore is filtered.

5. A process according to claim 2 in which said solutions of sodium aluminate are passed through a filtering bed of granular bauxite.

6. A process according to claim 5 in which said filtering bed of granular bauxite is comprised of layers of grains of bauxite, said layers differing each from the other in the degree of fineness of the grains within the layer and placed within the bed in such a manner that said solutions of sodium aluminate are passed first through the coarser layers and then through progressively finer layers of granular bauxite.

7. A process according to claim 5 which said filtering bed of granular bauxite is comprised of grains of bauxite varying in size from 5 mm. to 0.5 mm.

8. A process according to claim 5 in which the product resulting from the passing of said solutions of sodium aluminate through said filtering bed of granular bauxite is filtered.

9. A process for the elimination of iron oxide deposited on granular bauxite as a result of the contacting of solutions of sodium aluminate containing dissolved iron oxide with said granular bauxite which comprises washing said granular bauxite with a flowing solution of unpurified sodium aluminate, said solution flowing at a rate sufficient to place the iron oxide in suspension and to be carried away by said solution.

10. A process for the elmination of alumina deposited on granular bauxite as a result of the decomposition of solutions of sodium aluminate that have been contacted with said bauxite which comprises contacting said bauxite with a low-alumina-contact liquor which is heated to a temperature in the range from 80° to 110°C.

* * * * *